Patented Mar. 3, 1953

2,630,380

UNITED STATES PATENT OFFICE 2,630,380

CORROSION INHIBITION

William J. Hanson, Long Beach, and Robert W. Nex, Bellflower, Calif., assignors to The Dow Chemical Company, Midland, Mich., a corporation of Delaware No Drawing. Application October 1, 1951, Serial No. 249,211

9 Claims. (Cl. 71—2.3)

This invention is concerned with corrosion inhibition and is particularly directed to an inhibited composition comprising a 2,4-dinitro-6-alkyl-phenol, and to a method for preventing the corrosion of black iron in contact with 2,4-dinitro-6-alkyl-phenol compositions.

The 2,4-dinitro-6-alkyl-phenols with which the present invention is concerned are those having the formula

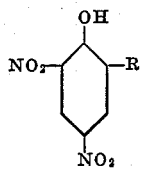

wherein R represents an alkyl radical containing from 3 to 5 carbon atoms, inclusive. These compounds are crystalline solids, somewhat soluble in water, and somewhat soluble in many organic solvents.

The specified dinitro-phenols are currently employed as active ingredients in agricultural spray compositions applied for the killing of insect and mite pests and for both selective and general control of undesired vegetation. In such use, the dinitro-phenols are commonly formulated as solutions in an organic liquid such as an aromatic oil, or as dispersions in oil-water emulsions. Among the problems attendant such operations has been the marked tendency of both the spray concentrates and dilutions to corrode black iron. This constitutes a major difficulty both in the distribution and application of the products, since the concentrates would normally be handled in tank cars or drums, and the diluted compositions contact the surfaces of spray equipment and tanks which are readily subject to corrosion. Fences, metal rails and posts, tower installations and the like also may be caused to pit and rust unless precautions are taken to avoid contact with the dinitrophenol formulations as applied. In spite of these difficulties, the dinitrophenols are being widely employed in weed and parasite control programs, and their utility makes essential the provision of means for controlling the corrosion problem.

It is among the objects of the present invention to provide means for minimizing the corrosion of metal surfaces by compositions comprising the 2,4-dinitro-6-alkyl-phenols. A further object is to provide compositions which contain additaments serving as corrosion inhibitors. Still another object is to provide a method whereby the corrosive action of solutions of the dinitro-alkyl-phenols is largely controlled. Other objects will become evident from the following specification and claims.

It has now been discovered that the corrosion of black iron by the 2,4-dinitro-6-alkyl-phenols and particularly solutions thereof in aromatic liquids and solvents and in aqueous emulsions and dispersions, is inhibited by incorporating in the dinitrophenolic composition an aryloxy polyethylene glycol compound of the formula

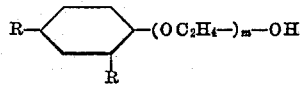

wherein R represents an alkyl radical containing from 3 to 5 carbon atoms, inclusive, and $m$ is an integer from 8 to 16, inclusive. In addition to serving as a corrosion inhibitor, such additament also serves as an emulsifying and dispersing agent when the composition is subsequently to be applied in water, and appears to enhance the herbicidal effectiveness of the dinitrophenolic constituent.

The aromatic liquid and solvent as herein employed may be any suitable organic liquid consisting predominantly of aromatic organic compounds and inclusive of the so-called aromatic petroleum oils, xylene, benzene, cumene, toluene, trichlorobenzene, and the like, provided only that such material exhibit solvent properties for the 2,4-dinitro-6-alkyl-phenols.

The amount of the aryloxy polyethylene glycol product required to accomplish the desired result of corrosion control, varies somewhat with the exact nature of the composition concerned. In general, from about 1 to 20 parts by weight of the aryloxy polyethylene glycol is employed with each 20 parts by weight of the 2,4-dinitro-6-alkyl-phenol constituent. Good results are obtained with from 4 to 10 parts by weight of the glycol product for each 20 parts by weight of the nitrophenolic constituent. Within this range, the glycol derivative not only serves to control corrosion, but also supplies the requirements of the ultimate composition as regards emulsifying and dispersing properties. Where the amount of glycol derivative employed is not sufficient to accomplish the dispersion of the composition in water, supplementary wetting and dispersing agents may be added. These preferably are of the non-ionic type such as the long chain alkyl sulfates and their salts, sorbitan ester derivatives of polyalkylene structures, oil soluble oleates, and the like.

Preferred embodiments of the invention include compositions comprising as an active phenolic ingredient a 2,4-dinitro-6-butyl-phenol and particularly 2,4-dinitro-6-secondarybutyl-phenol. The preferred polyglycol compounds are those produced from either 2,4-di-secondarybutyl-phenol or 2,4-di-tertiarybutyl-phenol and containing approximately 10 ethylene oxide molecules in their structure.

The preparation of the polyglycol ether derivatives is conveniently accomplished by successively reacting a molar proportion of the 2,4-dialkyl-phenol with 0.25 mole of metallic sodium and thereafter with from 8 to 16 moles of ethylene oxide under autogenous pressure and at 100°–150° C. The resulting crude reaction mixture is purified as by blowing with carbon dioxide and treating with water to remove residual alkali, clarification, filtration, low temperature distillation under reduced pressure to remove water and traces of low boiling constituents, etc. These products are viscous liquids at room temperature, soluble in aromatic oils, and readily dispersible in water.

The following examples illustrate the invention but are not to be construed as limiting:

EXAMPLE 1

A herbicidal composition was prepared comprising 2,4 - dinitro - 6-secondarybutyl-phenol as the active toxic ingredient and having the following percentage composition

| | Percent by weight |
|---|---|
| 2,4-dinitro-6-secondarybutyl-phenol | 56.0 |
| Toluene | 33.0 |
| 2,4-di-secondarybutyl-phenoxy polyethylene glycol | 11.0 |

The composition as obtained had a specific gravity of 1.095 at 20°/20° C. and a flash point (C. O. C.) of approximately 80° F. It was a free-flowing liquid at room temperature. It is hereinafter designated as Composition A.

The 2,4-di-secondarybutyl-phenoxy polyethylene glycol was a viscous liquid having a specific gravity of 1.06 at 20°/15.5° C. and prepared by reacting 287 pounds (1.4 moles) of 2,4-di-secondarybutyl-phenol (1) with 0.8 pound (0.035 mole) of metallic sodium at 100° C. under a blanket of nitrogen and (2) with 623 pounds (14 moles) of ethylene oxide in a closed reactor under autogenous pressure at 125° C. The product as herein employed had been blown with carbon dioxide to neutralize by-product sodium hydroxide, 5 to 10 percent by weight of water added, the water separated by heating the mixture to 125° C. under 20 millimeters pressure, and the residual product filtered to remove crystalline sodium carbonate.

An exactly similar composition was produced by substituting 2,4 - di - tertiarybutyl - phenoxy polyethylene glycol for the 2,4-di-secondarybutyl compound of Composition A. The di-tertiarybutyl-phenoxy derivative was prepared exactly as described for the di-secondarybutyl-phenoxy isomer. The physical properties of both polyethylene glycol derivatives were identical as were the properties of the formulations produced therefrom. This formulation is hereinafter identified as Composition B.

A check formulation was prepared in which a commercial wetting and dispersing agent was substituted for the 2,4-di-secondarybutyl-phenoxy polyethylene glycol. The agent employed was a mixture of oleic acid esters of polyethylene glycol marketed as Trem 014D. This formulation is henceforth referred to as Composition C.

Compositions A, B and C were tested to determine their comparative corrosive action against black iron. It was found that on storage for a number of months in black iron drums, Compositions A and B had no apparent effect upon the interior of the drums. Composition C attacked the interior of the drums to such an extent that the containers developed leaks at and about the seams with resultant loss of material and contamination of the product with precipitated iron salts in the form of dark insoluble sludge.

EXAMPLE 2

In controlled laboratory operations, portions of Compositions A, B and C were placed in glass containers and black iron test strips partially immersed in each composition. In one series of determinations, each composition was modified by the inclusion of a small amount of water prior to introduction of the test strips. The following table sets forth the results obtained at 75° F.:

Table 1

| Composition | Water Present | Months of Storage | Corrosion of Iron |
|---|---|---|---|
| A | no | 4 | no. |
| A | yes | 4 | no. |
| B | no | 4 | no. |
| B | yes | 4 | no. |
| C | no | 4 | yes. |
| C | yes | 4 | yes. |

EXAMPLE 3

In a further operation, the compositions were exposed to contact with black iron strips in an accelerated determination at 168° F. The following table sets forth the results obtained with Compositions A, B and C and a check solution of 56 parts by weight of 2,4-dinitro-6-secondarybutyl-phenol in 33 parts of toluene:

Table 2

| Composition | Days of Storage | Corrosion of Iron |
|---|---|---|
| A | 9 | no corrosion. |
| B | 9 | Do. |
| C | 3 | definite corrosion. |
| Check (2,4-dinitro-6-secondarybutyl-phenol and toluene only). | 3 | Do. |

EXAMPLE 4

Compositions A and C as described above were employed as contact herbicides for the control of a variety of undesirable plant species. In this operation, the compositions were dispersed in water in such proportion as to produce a spray containing 1.25 pounds of the 2,4-dinitro-6-secondarybutyl-phenol per 100 gallons. The aqueous composition was applied directly to the tops of the growing vegetation at the rate of 200 gallons per acre employing conventional spray equipment. Three weeks after application, the sprayed areas were examined. The following table sets forth the results obtained in terms of percentage top kill:

Table 3

| Composition | Plant Species | | | | |
|---|---|---|---|---|---|
| | Barley | Wild Oats | Filaree | Bur Clover | Australian Salt Bush |
| A | 50 | 65 | 90 | 60 | 35 |
| C | 15 | 35 | 80 | 35 | 20 |

In untreated check areas, the several plant species were in a flourishing condition of growth at the time of examination.

EXAMPLE 5

In similar fashion compositions are prepared containing as biologically active ingredients other dinitro-alkyl-phenols and aryloxy polyethylene glycols. The following are representative:

*Composition D*

| | Per cent by weight |
|---|---|
| 2,4-dinitro-6-isopropyl-phenol | 50.0 |
| 2,4-di-secondarybutyl-phenoxy polyethylene glycol (as in Example 1) | 11.0 |
| Xylene | 39.0 |

*Composition E*

| | Per cent by weight |
|---|---|
| 2,4-dinitro-6-secondaryamyl-phenol | 45.0 |
| 2,4-di-tertiarybutyl-phenoxy polyethylene glycol | 20.0 |
| Aromatic oil | 35.0 |

The di-tertiarybutyl-phenoxy polyethylene glycol as employed in the above composition is prepared as described in Example 1 but with a proportion of 16 moles of ethylene oxide for each mole of 2,4-di-tertiarybutyl-phenol.

The aromatic oil is that marketed as Shell E–407 oil. This had a specific gravity of 0.8956 at 60° F., a Saybolt color rating of 20, a flash point (Tag closed cup) of 160° F., a mixed aniline point of 27.6° C., and a boiling range of from 376° F. initial to 500° F. end point. The oil is from 75 to 85 percent aromatic in nature.

*Composition F*

| | Per cent by weight |
|---|---|
| 2,4-dinitro-6-normalbutyl-phenol | 50.0 |
| 2,4-di-isopropyl-phenoxy polyethylene glycol | 10.0 |
| Benzene | 40.0 |

The 2,4 - di - isopropyl - phenoxy polyethylene glycol employed in the above composition is prepared as described in Example 1 for the 2,4-di-secondarybutyl-phenoxy derivative by substituting the di-isopropyl phenol for di-secondarybutyl-phenol. Also, 8 molar proportions of ethylene oxide per mole of phenol are employed instead of the 10 as shown in the previous example.

*Composition G*

| | Per cent by weight |
|---|---|
| 2,4-dinitro-6-secondarybutyl-phenol | 53.0 |
| 2,4-di-secondaryamyl-phenoxy polyethylene glycol | 12.0 |
| Xylene | 35.0 |

The 2,4-di-secondaryamyl-phenoxy polyethylene glycol was prepared substantially as described in Example 1 for the di-secondarybutyl-phenoxy compound by substituting 2,4-di-secondaryamyl-phenol for the corresponding dibutyl-phenol.

We claim:

1. A composition of matter comprising (1) a dinitro-alkyl-phenol of the formula

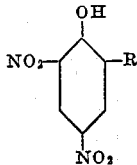

wherein R represents an alkyl radical containing from 3 to 5 carbon atoms, inclusive, and (2) as a corrosion inhibitor therefor an aryloxy polyethylene glycol of the formula

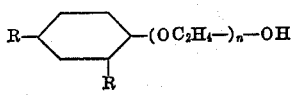

wherein R represents an alkyl radical containing from 3 to 5 carbon atoms, inclusive, and $n$ is an integer from 8 to 16, inclusive.

2. A composition according to claim 1 in which for each 20 parts by weight of the dinitro-alkyl-phenol there is contained from 1 to 20 parts by weight of the aryloxy polyethylene glycol.

3. A composition according to claim 1 in which the dinitro-alkyl-phenol is 2,4-dinitro-6-secondarybutyl-phenol.

4. A composition according to claim 1 in which the aryloxy polyethylene glycol constituent is the reaction product of a 2,4-di-butyl-phenol and approximately 10 molar proportions of ethylene oxide and is present in the amount of from 4 to 10 parts by weight for each 20 parts by weight of the dinitro-alkyl-phenol constituent.

5. A composition of matter comprising a solution in an aromatic solvent of (1) a dinitro-alkyl-phenol of the formula

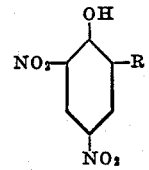

wherein R represents an alkyl radical containing from 3 to 5 carbon atoms, inclusive, and (2) as a corrosion inhibitor therefore an aryloxy polyethylene glycol of the formula

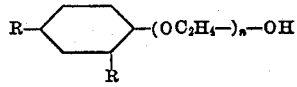

wherein R represents an alkyl radical containing from 3 to 5 carbon atoms, inclusive, and $n$ is an integer from 8 to 16, inclusive.

6. A composition of matter comprising 2,4-dinitro-6-secondarybutyl-phenol and as a corrosion inhibitor therefor from 4 to 10 parts by weight of an aryloxy polyethylene glycol which is the reaction product of a 2,4-di-butyl-phenol and approximately 10 molar proportions of ethylene oxide, for each 20 parts by weight of dinitrobutyl-phenol constituent.

7. A method for minimizing the corrosive action against black iron of liquid dispersions of dinitro-alkyl-phenols of the formula

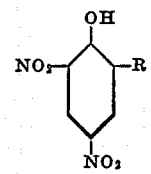

wherein R represents an alkyl radical containing from 3 to 5 carbon atoms, inclusive, which comprises the step of dispersing therein from 1 to 20 parts by weight of an aryloxy polyethylene glycol of the formula

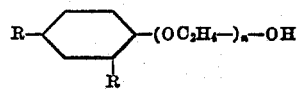

wherein R represents an alkyl radical containing from 3 to 5 carbon atoms, inclusive, and $n$ is an integer from 8 to 16, inclusive, the range of proportion of the latter being from 1 to 20 parts by weight for each 20 parts by weight of the dinitro-alkyl-phenol constituent.

8. A method according to claim 7 wherein the dinitro-phenol compound is 2,4-dinitro-6-secondarybutyl-phenol.

9. A method according to claim 7 wherein the aryloxy polyethylene glycol is the reaction product of a 2,4-dibutyl-phenol and approximately 10 molar proportions of ethylene oxide, and is employed in the proportion of from 4 to 10 parts by weight for each 20 parts by weight of the dinitro-alkyl-phenol constituent.

WILLIAM J. HANSON.
ROBERT W. NEX.

REFERENCES CITED

The following references are of record in the file of this patent:

UNITED STATES PATENTS

| Number | Name | Date |
| --- | --- | --- |
| 2,089,580 | Schulze | Aug. 10, 1937 |
| 2,392,859 | Meuli | Jan. 15, 1946 |
| 2,450,321 | White | Sept. 28, 1948 |